Patented Feb. 18, 1947

2,416,176

UNITED STATES PATENT OFFICE 2,416,176

PROCESS FOR THE TREATMENT OF PLANT FLESH AND THE RECOVERY OF PECTIC PRODUCTS THEREFROM

Thomas Percy Hoar, Cambridge, and Elsie Lilian James, Bulstrode, Gerrards Cross, England, assignors to African Sisal & Produce Company Limited, Bulstrode, England, a company of Great Britain No Drawing. Application June 3, 1944, Serial No. 538,689. In Great Britain February 14, 1944

6 Claims. (Cl. 260—209.5)

This invention relates to an improved process for the treatment of plant flesh and the recovery of pectic products therefrom, and has more particular reference to the utilisation of the fleshy material obtained from the sisal plant, and like vegetable matter including sansevieria and phormium tenax.

In the commercial extraction of fibres from sisal and like plants, whether the extraction be by wet or dry decortication, or as a result of retting, or of a chemical or mechanical separation of the fibres from the leaf or plant flesh, there remains a considerable bulk of vegetable matter coupled with a small percentage of fibre which is normally a waste product. It is the purpose of our present invention to provide improvements in the treatment and utilisation of this flesh material for the recovery of definite commercial products.

Our analyses of and experiments upon this fleshy material have shown that it contains a variety of materials of commercial value and inter alia water soluble materials of a glucosidic and also of a protein-like nature; pectic substances; and ligno-cellulose.

Whilst extraction processes are known for the removal of glucosides and colouring matters and also for the extraction and recovery of colloidal pectic substances without submitting the plant flesh to a preparatory process of controlled treatment, the products yielded heretofore both in quality and quantity are far below those known to be present, the colour is unsatisfactory and their purity leaves much to be desired.

It has to be remembered that all vegetable products after severance from the live plant suffer or tend to suffer derogatory change induced by fermentation, enzyme action, degradation under actinic influences and the like and these augment or tend to augment factors inhibitory to extraction present in the fresh cut vegetation.

An object of the present invention is to remove by a controlled pre-treatment of the flesh the said inhibitory factors enabling much larger and more stable yields of products to be obtained, all having an improved appearance, colour and analysis.

It is a further object of the invention to provide processes suitable for the extraction, from the flesh so pretreated, of the pectic products therein, said extraction by the processes now to be described being more complete, and the products purer and of better physical properties, than have heretofore been possible.

The invention consists in an improved process for the treatment of plant flesh of the type above indicated, and in the recovery of pectic products therefrom, by the removal of said inhibitory factors, colouring matters and degenerated products while substantially avoiding extraction of pectic substances from the flesh, by preparation processes which embrace subjecting the flesh to leaching by water either for a number of hours at a temperature down to as low as 10° C., or for a short time such as 15 minutes to a temperature between 80° C. and 100° C., and preferably with agitation, and in then separating the pretreated flesh for further treatment from the previously added water.

A further part of the invention in the pretreatment of the said flesh may also be to add a small quantity of an aqueous solution of a bleaching agent to the cold or hot leaching or washing water such as sodium hypochlorite. It is preferable that such bleaching agent should be added to the leaching or washing water, whether hot or cold before the flesh is immersed therein.

Additionally or alternatively to the above treatments and dependent upon the pectic products required, and as herein set out, the said raw or pretreated plant flesh may be washed at room temperature with a dilute acid that has a soluble calcium salt.

The dewatered flesh remaining from the above pretreatment process or processes is now in a very suitable condition for the extraction of the pectic products and this embraces the production of alkali-metal pectates, of other metallic pectates, of ammonium pectate and pectin as set out hereafter.

Pectic products of substances as herein described are to be understood to include all those polymeric substances recurring in or latent in the plant flesh that are characterised by giving rise on depolymerisation to galacturonic acid, galactose, arabinose and related compounds. They consist essentially of polygalacturonic acids, with or without galactans and arabans in physical admixture or chemical association, and the simple derivatives thereof, such as the salts of polygalacturonic acid, and the methyl esters of polygalacturonic acid that are known as pectins or pectinic acids.

A preferred manner of operating the invention is set out below with a series of practical examples, but wherein it may be necessary to make appropriate small deviations from the figures given to allow for (a) age of plant, (b) soil in which it has grown, (c) season of cutting, (d) type of decortication, (e) period of delay between cutting and process treatment. Examples 1 to 6 refer to the pretreatment processes, Examples 7 to 10 to the extraction processes we have found to be suitable for the pre-treated flesh.

*Example 1.*—The flesh is leached with 15 to 30 times its weight of water, preferably soft water, for 24 hours at 10° C. to 20° C., preferably with agitation, and is then separated from the liquor by draining, and washed if desired with more water.

Example 2.—The flesh is leached with 15 to 30 times its weight of water, preferably soft water, for ¼ to ½ hour at 80° C. to 100° C., preferably with agitation, and is then separated from the liquor by draining, and washed if desired by more water. It is understood that lower temperatures such as 30° C. to 75° C. may be used when correspondingly longer periods of time for leaching should be allowed.

Example 3.—To the leaching water as in Examples 1 or 2 is added a quantity of a bleaching agent such as sodium hypochlorite, preferably before the addition of the flesh. We have found that a suitable amount is 2½ litres of commercial sodium hypochlorite solution of 15% strength to every 60 to 70 gallons of leaching water, but it will be understood that the amount to be used will depend on the colour and condition of the flesh being processed and may have to be determined on each batch by trial.

Example 4.—To the washing water as in Examples 1 or 2 is added a bleaching agent such as sodium hypochlorite, as described in Example 3. A further wash with water may be given if desired.

Example 5.—To the leaching water as in Example 1 is added 2% to 5% by volume of commercial concentrated hydrochloric acid and the leaching is allowed to proceed for ¼ to 5 hours. This treatment results in a change in the pectic substances within the flesh, but does not produce their extraction; and on washing out the excess acid and proceeding to any of the pectic extractions as set out in Examples 7 to 10 we find that these are made easier in every case, in that they proceed to completion at lower temperatures and in some cases in less time. Furthermore in the extraction of pectate, alkalies not containing calcium-precipitating anions can be used, for instance sodium hydroxide; and in the extraction of pectin, more dilute reagents can be used, doubtless because the acid soaking removes a good deal of the calcium from the flesh by breaking down calcium pectate linkages and dissolving any free calcium carbonate. Suitable amounts and conditions are:

| | Parts by weight |
|---|---|
| Flesh | 1 |
| 0.5 hydrochloric acid | 15 | used cold for three hours. The resulting flesh after being washed with cold water to remove excess hydrochloric acid gives immediate extraction of some pectate in the cold and a good yield at 80° C. when processed according to Example 7. The dilute hydrochloric acid may be removed and used over again.

Example 6.—To the washing water as in Examples 1 or 2 is added hydrochloric acid as described in Example 5 and the dilute acid is maintained in contact with the flesh for ¼ to 5 hours at room temperature, after which it is washed out with more water. This acid wash may also be applied to the flesh first treated either according to Example 3 or 4, if an intermediate wash with water is given to remove excess sodium hypochlorite before the addition of acid.

Example 7.—The flesh pre-treated according to any of Examples 1 to 6 is mixed with a solution of an alkali-metal or ammonium salt having an alkaline reaction, of which the anion gives an insoluble salt with calcium ions. Thus sodium carbonate or trisodium phosphate or sodium meta-silicate are suitable extracting agents. The effect of the extracting agent is two-fold; it hydrolyses any methoxy groups in the protopectin of the plant material, and it decomposes any calcium pectate linkages in the protopectin with the formation of an insoluble calcium salt; the alkali-metal salt of pectic acid is thus produced and this dissolves colloidally in the aqueous extracting solution. Convenient amounts of the materials are:

| | Parts by weight |
|---|---|
| Flesh | 1 |
| Water | 30 |
| Sodium carbonate (anhydrous) | 0.2 | the extraction being carried on for 15 to 30 minutes at 60° C. to 100° C. with stirring. It will be understood that these amounts, times and temperatures are given by way of example only and may be widely varied according to the particular sample of raw material, the conditions obtaining at the factory, for example, the amount of time, fuel and sodium carbonate available, and the nature of the product desired. Indeed, the extraction using the above formula may be made in the cold, at say 20° C. if the time allowable is of the order of 24 hours, and if the highest percentage yield is not a prime consideration.

It should be understood that the amount of "flesh" specified in this example and all other examples herein refers to the original weight of air-dry flesh taken before pre-treatment.

When trisodium phosphate is used for the extraction this may particularly well be made at comparatively low temperatures, a convenient formula being:

| | Parts by weight |
|---|---|
| Flesh | 1 |
| Water | 30 |
| Trisodium phosphate | 0.25 | used at a temperature of 30° C. with stirring, for ½ to 2 hours.

The alkali-metal pectate sol resulting from either of these extractions or equivalent processes using other suitable alkali-metal salt solutions, is filtered off, and from it is precipitated either:

(a) Alkali-metal pectate, which may be produced either by the addition of alcohol, acetone or like water-miscible organic solvent, or by the addition of a concentrated solution of sodium chloride (say 30/35% by weight), sodium sulphate or other electrolyte that does not react with the alkali-metal pectate. The gelatinous precipitate of alkali-metal pectate is collected, dried and ground, and is then a marketable product taking the form of a white or nearly white powder, readily dispersible in water to form viscous solutions or gels; the whiteness of the product may be improved by adding a small proportion of sodium hypochlorite solution before or during the precipitation.

(b) Pectic acid which may be produced by the addition of any acid (hydrochloric acid being suitable) having a dissociation constant greater than about $10^{-4}$, to the alkali-metal pectate sol; a flocculent precipitate is produced which is collected by settlement or filtration, and which is dried and powdered as under (a). It is a nearly white powder soluble in alkaline solutions, sparingly soluble in water. When the extraction has been made with sodium meta-silicate the pectic acid floc may contain also silicic acid.

(c) Metallic pectates, produced by the addition of a dilute solution of a water-soluble metallic salt to the alkali-metal pectate sol, whose pH has previously been brought to a value of 7 or less by the cautious addition of an acid such as hydrochloric, nitric or acetic acids, and from which adjusted solution excess carbon dioxide (in the case of an extraction made with sodium carbonate) has preferably been boiled off or blown off with a current of air, and which has preferably been diluted if necessary so that it contains not more than ¼% of pectate; for example, zinc chloride, nickel chloride, silver nitrate or calcium chloride solutions may be added to give zinc pectate, nickel pectate, silver pectate and calcium pectate respectively as flocculent precipitates which may be removed, dried and powdered as before. These pectates are insoluble in water.

When it is desired to prepare ammonium pectate, this may be produced as a sol by the dissolution of pectic acid in ammonia or directly from the flesh by extraction with a solution of ammonium phosphate, under the same conditions as those stated above for trisodium phosphate, except that the temperature should be about 20° C. higher.

*Example 8.*—If the extraction of the flesh pretreated according to any of Examples 1 to 6 is carried out by means of a solution of an alkali-metal salt having an anion that forms water-soluble complexes with calcium, then if the solution has a pH below 7, pectin is extracted, whereas if the solution is substantially alkaline, alkali-metal pectate is the product. Such alkali-metal salts are the hexametaphosphates, pyrophosphates and the like, and a suitable formula for making the pectin extraction is:

| | Parts by weight |
|---|---|
| Flesh | 1 |
| Acid sodium hexametaphosphate | 0.1 |
| Water | 30 | used at boiling point for 5 to 30 minutes. The same formula, but with the liquor adjusted to pH 9–10 with sodium hydroxide or other alkali, may be used to give an extract of sodium pectate. From the sols produced, alkali-metal pectate is obtained in the dry condition by means of processes similar to those already set out or referred to, in Example 7, while pectin is obtained by salting out or by other known means.

*Example 9.*—When the flesh has been pretreated according to Examples 5 or 6, the extraction of pectic substances may be achieved by the use of alkaline solutions not containing anions forming insoluble calcum salts or soluble calcium complexes. Thus, ammonia or the alkali-metal hydroxides may be used. The conditions as to amounts, times and temperatures may be widely varied, but are in general similar to those given in Examples 7 and 8. In particular it may be mentioned that partial extraction by ammonia solution can be achieved under the following conditions:

| | Parts by weight |
|---|---|
| Flesh | 1 |
| Water | 30 |
| Ammonia (S. Cr. 0.880) | 0.5 | used at room temperature for ¼ hour.

*Example 10.*—The flesh pre-treated according to any of Examples 1 to 6 is in a very favourable condition for the extraction of pectin. In particular, a suitable formula is:

| | Parts by weight |
|---|---|
| Flesh | 1 |
| Ammonium oxalate | 0.3 |
| Water | 40 | the liquor being adjusted to pH 5 or thereabouts by the addition of oxalic acid, and used at 60° C. for ½-hour. The pectin sol so produced is filtered from the flesh, preferably on a filter primed with kieselguhr, and from it pectin is recovered by salting out, by the use of alcohol or the like, by precipitation with aluminium hydroxide, or by other known means. It will be understood that some yield of pectin may be obtained by treatment of the pre-treated flesh with any warm or hot aqueous electrolyte having a pH of about 5 or less, but that the conditions stated above have been found especially suitable for the particular pre-treated flesh herein described.

We claim:

1. In a process for the treatment of plant flesh and for the recovery of pectic substances therefrom, comprising stripping the flesh from the fibrous backbone of the plant, pretreating the stripped flesh by leaching with water for a length of time and at a temperature insufficient to effect extraction of pectic substances from the flesh, washing the flesh with water, then separating the pretreated flesh and extracting the pectic substances therefrom; the improvement which comprises employing a cold solution not exceeding about 2% to 5% by volume of commercial hydrochloric acid during the pretreating stage and prior to extraction of the pectic substances for the purpose of facilitating the subsequent extraction of the pectic substances.

2. A process as set forth in claim 1 wherein hypochlorite is added to the leaching water.

3. A process as set forth in claim 1 wherein hypochlorite is added to the washing water.

4. A process as set forth in claim 1 wherein cold hydrochloric acid is added to the leaching water.

5. A process as set forth in claim 1 wherein cold hydrochloric acid is added to the washing water.

6. A process as set forth in claim 1 wherein the pectic substances are extracted from the pretreated flesh by treating said flesh with an aqueous alkaline solution containing a member of a group consisting of alkali metal and ammonium salts having an alkaline reaction, of which the anion gives an insoluble salt with calcium ions.

THOMAS PERCY HOAR.
ELSIE LILIAN JAMES.

REFERENCES CITED

The following references are of record in the file of this patent:

UNITED STATES PATENTS

| Number | Name | Date |
|---|---|---|
| 2,008,999 | Wallerstein | July 23, 1935 |

OTHER REFERENCES

American Jour. of Botany, November 1926, pages 536–543.